United States Patent Office 3,234,531
Patented Feb. 8, 1966

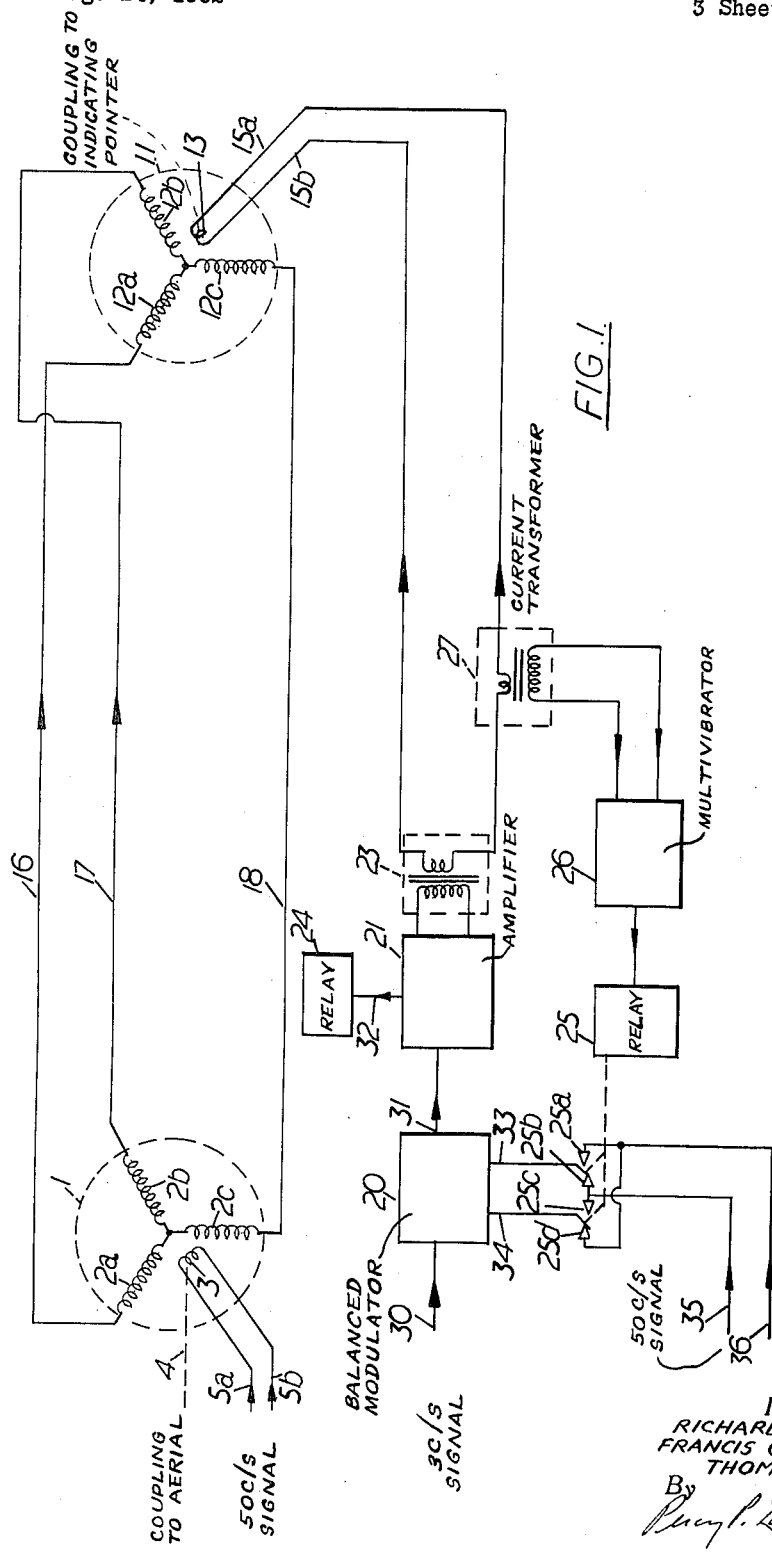

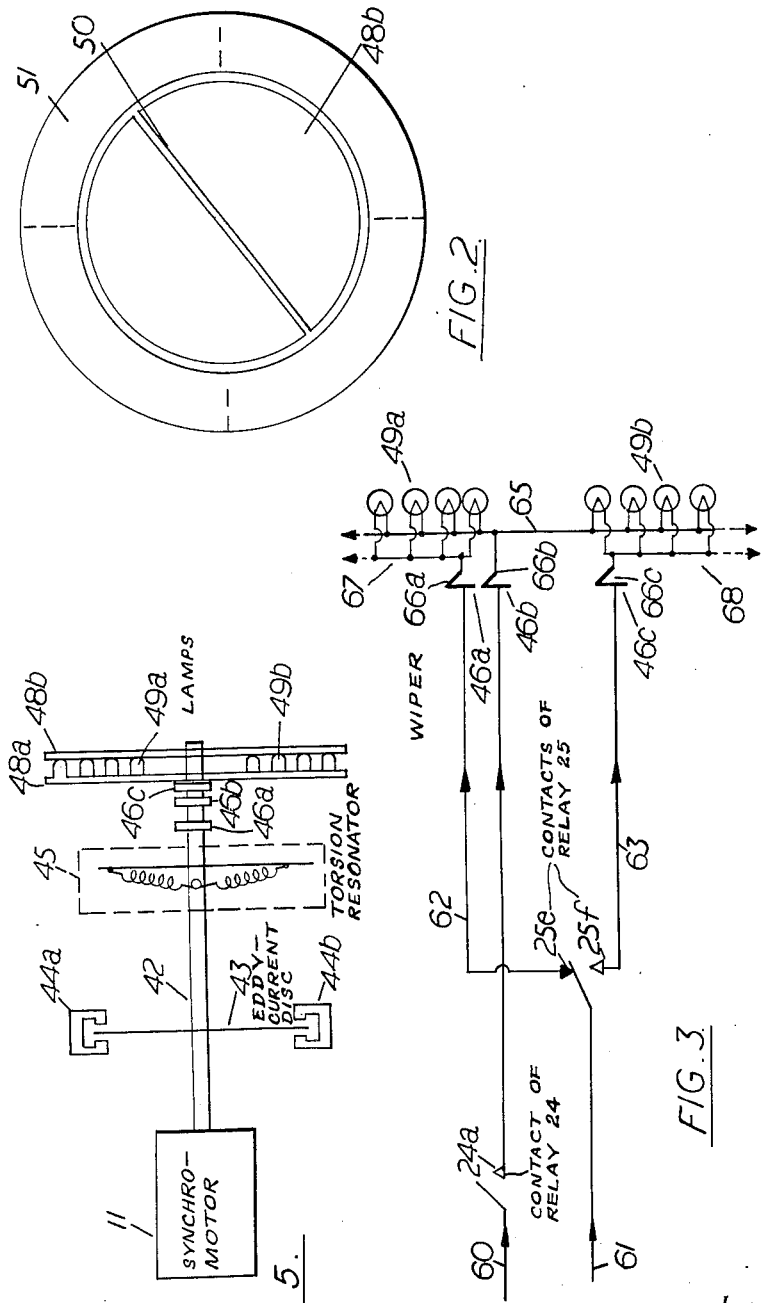

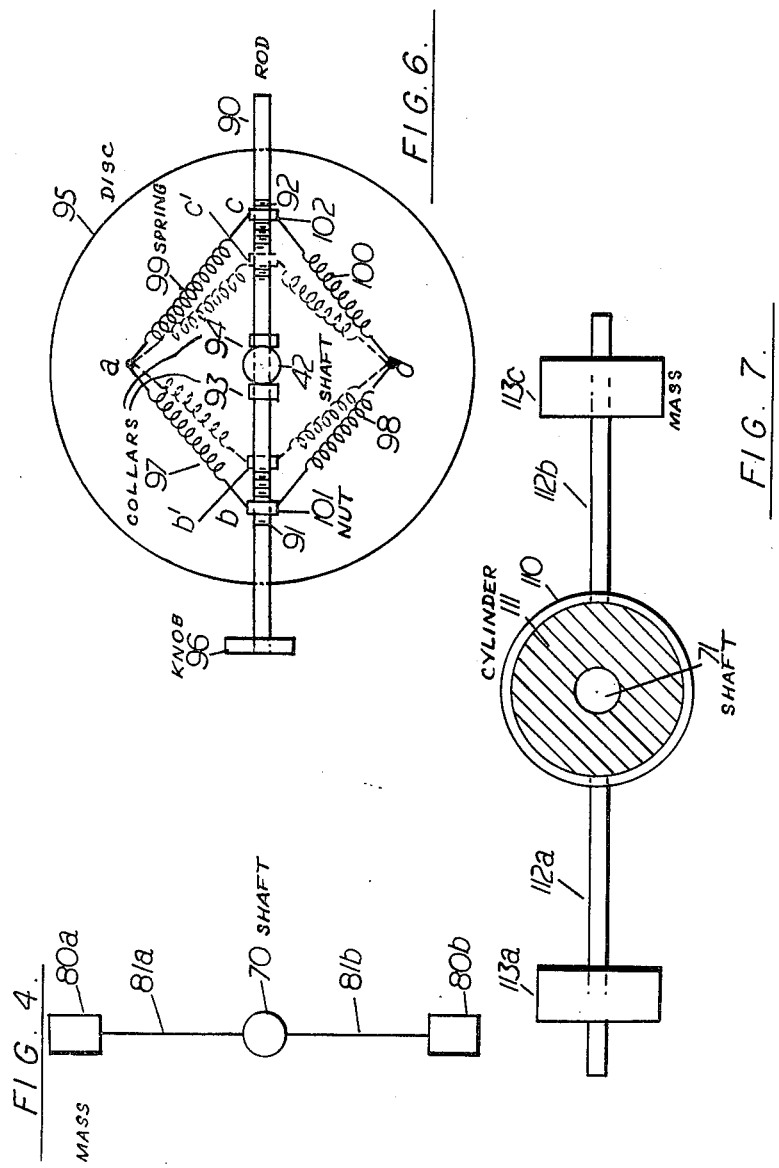

3,234,531
ANGLE INDICATOR
Richard Francis Cleaver, Francis Geoffrey Cockerill, and Thomas James Cox, London, England, assignors to International Standard Electric Corporation, New York, N.Y., a corporation of Delaware
Filed Aug. 24, 1962, Ser. No. 219,291
Claims priority, application Great Britain, Sept. 1, 1961, 31,548/61
8 Claims. (Cl. 340—198)

This invention relates to angle indicators.

Angle indications are usually provided by means of an indicating line or pointer rotating about an axis. One of the difficulties encountered with such arrangements is that there is a delay in indication introduced by the time taken to move the indicating line or pointer from one position to the next.

The present invention provides an arrangement in which this time delay is reduced considerably.

According to the present invention there is provided an angle indicator including a plurality of indicator arms, means to detect the magnitude of an angle to be indicated, means to cause the nearest of the said arms to indicate the position defining the magnitude of the angle and means to indicate the said arm.

A circuit arrangement embodying the invention together with apparatus for use in arrangements embodying the invention will now be described with reference to the accompanying drawings which show:

In FIG. 1, a schematic diagram of a circuit arrangement,

In FIG. 2, a plan view of an indicating device,

In FIG. 3 a schematic circuit for use in the indicating device of FIGS. 2 and 5, In FIG. 4 schematic illustration of a torsion resonator suitable for use with indicating devices of the type shown in FIGS. 2 and 5, In FIG. 5, a simplified longitudinal cross-sectional view of the indicating device shown in FIG. 2, and In FIGS. 6 and 7, schematic illustrations of torsion resonators suitable for use with indicating devices of the type shown in FIGS. 2 and 5.

Referring to FIG. 1 there is shown a circuit arrangement suitable for use with a Doppler direction finding system described in our co-pending U.S. Patent application (R. F. Cleaver-F. G. Cockerill) Serial No. 209,017, filed July 11, 1962, which corresponds to British application No. 35,149 filed in Great Britain on September 1, 1961, and embodying the present invention.

Although the invention is described with particular reference to this system it will be understood that it may be used in other arrangements where it is necessary to indicate angles.

The circuit arrangement shows a rotary variable transformer in the form of a synchrogenerator 1 having stationary windings 2a, 2b and 2c, and a rotary winding 3. The winding 3 is mechanically coupled to a rotating aerial (not shown) by a coupling 4, and rotated at a frequency of 3 c./s. A 50 c./s. alternating current is passed through the winding 3 via leads 5a and 5b.

A second rotary variable transformer in the form of a synchromotor 11 having stationary windings 12a, 12b and 12c and a rotary winding 13 is shown with windings 12a, 12b and 12c connected to the windings 2a, 2b, and 2c respectively, via conductors 16, 17 and 18.

A balanced modulator 20 has a 3 c./s. signal applied to it via lead 30. This signal is obtained from a frequency modulation superimposed on the signal received by the aerial (not shown).

A 50 c./s. signal, obtained from the same source as that applied to the winding 3, is applied via leads 35 and 36, change-over contacts 25d and 25b, or 25c and 25a, and leads 33 and 34 to the balanced modulator 20.

The output from modulator 20 is applied via lead 31, amplifier 21, output transformer 23, and leads 15a and 15b to the winding 13 of the synchromotor 11.

A relay 24 which acts as a signal presence detector is shown connected via lead 32 to the amplifier 21.

A current transformer 27 is shown with its primary winding connected in the lead 15a, and its secondary winding connected via a multivibrator 26 to the winding of the relay 25.

In operation the aerial (not shown) is rotated at 3 c./s. and, since the winding 3 of the synchrogenerator 1 is mechanically coupled to the aerial and supplied with a 50 c./s. signal, an amplitude modulated output is obtained across the stationary windings 2a, 2b and 2c. This amplitude modulated output is applied to the respective windings 12a, 12b and 12c of the synchromotor 11 via conductors 16, 17 and 18.

The 3 c./s. signal applied to modulator 20 via the lead 30 has a phase relation with respect to the 3 c./s. rotation of the winding 3 which is determined by the bearing of a signal received by the aerial, and it is this bearing which is to be indicated.

This 3 c./s. signal is beaten with the 50 c./s. signal applied to the balanced modulator 20 via leads 33 and 34, and the amplitude modulated output obtained is applied via lead 31, amplifier 21, output transformer 23 and leads 15a and 15b to the winding 13 of the synchromotor 11.

The rotating magnetic field produced by the stationary windings 12a, 12b and 12c, is a reference field, and the rotary winding 13 will take up a position determined by the interaction between this field and the field caused by the current flowing in it.

This position will therefore bear a direct relation to the difference in phase between the rotating field produced by the stationary windings and that produced by the rotary winding, and thus to the bearing of the signal received by the aerial.

By attaching an indicating pointer to a rotor upon which winding 13 is wound an indication of a bearing is given.

The manner in which this indication is made in accordance with the invention will now be more fully explained with reference to FIGS. 1, 2, 3, and 5.

FIG. 5 shows the synchromotor 11 and a shaft 42 upon which the rotor of the synchromotor is mounted. Two discs 48a and 48b are mounted on the shaft 42 and between these discs are arranged two rows of lamps 49a and 49b.

Slip rings 46a, 46b, and 46c are mounted on the shaft in order to enable electrical connections to be made to the lamps.

A torsion resonator arrangement mounted on the shaft 42 is indicated within the dotted line 45, and an eddy current disc 43 mounted on the shaft is shown rotatable between permanent magnets 44a and 44b.

FIG. 2 shows the disc 48b in which there is provided a slot 50 beneath which the lamps are placed, and an annular plate 51 surrounding the disc 48b and upon which a bearing scale may be arranged.

Referring to FIG. 3 there are shown leads 60 and 61 for the connection of a supply to the rows of lamps 49a and 49b. Lead 60 is connected via relay contacts 24a, slip ring 46b, wiper 66b and a lead 65 to one side of each of the lamps. Lead 61 may be connected either via relay contact 25e, lead 62, slip ring 46a, wiper 66a, and lead 67 to the other side of the lamps in row 49a, or via relay contact 25f, lead 63, slip ring 46c, wiper 66c and lead 68 to the other side of the lamps in row 49b.

Referring again to FIG. 1 we can assume that the rotor is in a certain position determined by the interaction between the fields produced by stationary windings 12a, 12b, and 12c and rotary winding 13.

The phase of the current in the winding 13 changes as a function of the change in the bearing of the received signal, and the greater the change in the bearing the greater will be the change in the phase of the current in the winding.

This change in phase causes a change in the interaction between the fields of the winding 13 and the windings 12a, 12b, and 12c, and causes the rotor upon which winding 13 is wound to move to a new position and restore the interaction between the fields to normal.

As has been described with reference to FIG. 5, a particular embodiment of an angle indicator has two indicator arms formed by rows of lamps 49a and 49b. By using an indicator of this type it is possible to employ whichever of the arms is nearer to the new position to be indicated.

In this particular case, where the arms are 180 degrees apart, it is necessary to detect when the new position is more than 90 degrees from the old position. In such cases the other arm is nearer to the new position than the arm already providing an indication.

It has been found that a simple way of detecting whether or not the angle through which the rotor must turn to the new position is more than 90 degrees is by detecting whether or not the current in the rotor winding 13 increases above a certain value.

Due to the construction of the normal synchromotor with three stationary windings there is a marked increase in current in the rotary winding when the angle through which it must turn to the new position is more than 90 degrees.

A simple method of detecting this increase in current, and of indicating which of the arms is to provide the indication of the new position will now be described.

The current in the rotary winding 13 passes through the primary winding of transformer 27 and the effect of this increase in current is transmitted to the multivibrator 26 which is arranged to operate in response to this marked increase in current.

The operation of the multivibrator 26 causes relay 25 to operate and the operation of this relay produces a reversal in the polarity of the 50 c./s. supply applied to modulator 20 by the operation of changeover contacts 25a, 25b, and 25c and 25d.

This change in polarity causes a 180 degree change in the field of the rotary winding 13 so that instead of having to move through an angle greater than 90 degrees to take up its new position it will only move through an angle of 180 degrees minus the angle through which it would otherwise have moved.

At the same time the operation of relay 25 causes the supply current through lead 61 (FIG. 3) to pass via contact 25f instead of contact 25e. This changeover causes arm 49b to be illuminated and indicates that this is the arm which is now giving the indication of the bearing and not arm 49a.

A relay 24 (FIG. 1) is connected to amplifier 21 and acts as a detector of the presence of a signal in the amplifier so that if the signal fails the relay releases and contact 24a (FIG. 3) opens and the lamps 49a and 49b cannot be illuminated.

Referring to FIG. 4 there is shown a shaft 70 of an indicating device, similar to shaft 42 shown in FIG. 5. Mounted on shaft 70 are two radial arms 81a and 81b made of spring strip. At the ends of the arms there are arranged masses 80a and 80b.

At FIG. 6 there is shown the torsion resonator arrangement indicated at 45 in FIG. 5. This arrangement includes a rod 90 passing through the shaft 42, and a disc 95 freely mounted for rotation on the shaft 42. A knob 96 is arranged on rod 90 so that the rod may be rotated. Collars 93 and 94 on rod 90 prevent any movement of rod 90 longitudinally through shaft 42. Nuts 101 and 102 are arranged on threaded portions 91 and 92 of the rod 90, and these threaded portions are such that one is a right-hand thread and the other a left-hand thread.

Springs 97, 98, 99 and 100 are arranged between the nuts 101 and 102 and two points a and d on disc 95.

Referring to FIG. 7 there is shown a shaft 71 similar to shaft 42, and upon which are mounted a cylinder 111 of resilient material, and a metal cylinder 110. Two radial arms 112a and 112b extend from the cylinder 110 and have masses 113a and 113c mounted upon them.

These arrangements shown in FIGS. 4, 6 and 7 are torsion resonators which are tuned to a resonant frequency at which the shaft of a rotating device to which they attached tends to resonate.

The resonator shown in FIG. 4 has a fixed resonant frequency determined by the dimensions and material of the arms 81a and 81b and by the value of the masses 80a and 80b.

The resonator shown in FIG. 7 also has a resonant frequency determined by the properties of the material from which it is made and in addition it is possible to vary this frequency by moving the masses 113a and 113c along the arms 112a and 112b.

Referring to FIG. 6 it can be seen that the resonant frequency of this resonator may be adjusted by rotating rod 90 by means of knob 96 and thereby moving the nuts 101 and 102 along the rod 90.

Since the threads 91 and 92 are of opposite pitch rotation of the rod will cause the nuts to move in opposite directions along the rod.

Thus in the arrangement shown the nuts are indicated as having been moved from positions b and c to the dotted positions b' and c'.

At the same time the springs 97, 98, 99 and 100 are also moved to the dotted positions shown, and their movement contributes to the change in resonant frequency produced.

These torsion resonators have particular application in indicators such as those required for use in embodiments of the present invention since they reduce the time delay required to obtain an indication of an angle by giving a more immediate indication than would be possible without their use.

This more immediate indication is obtained since the indicating line or pointer does not tend to oscillate to such an extent about the position to be indicated.

Although the invention has been described with reference to an indicating device which has a pair of arms which are 180 degrees apart, it is possible to use other combinations of arms so that the rotor need move through even smaller angles.

For example, by using conventional synchros with three stationary windings it would be possible to arrange for the signals fed to the stationary windings 12a, 12b and 12c to be commutated so that the stationary winding field could be moved round in steps of 120 degrees and to use three indicating arms spaced apart by 120 degrees.

Changes of phase of the signal applied to the modulator 20 caused by changes in the bearing angle of a received signal could be measured independently, and in cases where they exceeded certain angles it could be arranged that the field produced by the stationary windings be moved around by either 120 or 240 degrees by the commutation of the applied signals, so that the interaction between the rotary winding and stationary winding fields would be such that the rotor would rotate by a suitable angle to bring one of the other arms into the indicating position.

This other arm could be indicated in a similar manner to that described in FIG. 3.

The arm giving the indication could, of course, be indicated in any other manner, for example by making each arm of a distinctive colour and by lighting a lamp of the colour associated with the particular arm giving the indication.

What we claim is:

1. An angle indicator comprising, rotatable indicating means, a synchro-generator, a synchro-motor, the rotor of said synchro-generator being coupled to a rotating input, a source of alternating current applied to the rotor winding, the stationary windings of said synchro-generator being coupled to the stationary windings of said synchro-motor, said synchro-motor rotor rotating said rotatable indicating means, a balanced modulator, said modulator having two inputs, one an input from said source of alternating current, the second from an indication command source, means coupling the output of said balanced modulator to the rotor winding of said synchro-motor, a current transformer connected in the rotor circuit of said synchro-motor, a relay, means coupling said relay to said current transformer, the contacts of said relay controlling the phasing of the first input to said balanced modulator, whereby the phase of said alternating current source applied to said modulator can be reversed, and means coupling additional contacts of said relay to a source which powers said indicating means for controlling said indicating means.

2. An angle indicator as in claim 1, wherein said indicating means extends on radii from the axis of rotation of said synchro-motor rotor with said additional contacts controlling which of said radii is illuminated.

3. An angle indicator as in claim 1, and further including means sensing the presence of said indication command for energizing said indicating means.

4. An angle indicator as in claim 1, and further including an eddy current disc coupled to said synchro-motor rotor and being rotatable between permanent magnets.

5. An angle indicator as in claim 1 in which said rotatable indicating means comprises two discs having a row of lamps interposed and a slot in one disc, and further including an annular plate with a scale arranged thereon surrounding said slotted disc.

6. An angle indicator as in claim 1, and further including a torsion resonaator attached to the shaft of said synchro-motor rotor.

7. An angle indicator as in claim 6 in which said torsion resonator includes a disc freely mounted for rotation on said synchro-motor rotor shaft, a rotatable rod passing through said shaft with collars mounted on said rod thereby precluding longitudinal movement thereof, and springs arranged between said rod and a fixed point on said disc.

8. An angle indicator as in claim 7 in which said rods have threaded portions either side thereof, said threads being of opposite pitch, wherein said springs are attached to nuts arranged on said threaded portions, and whereby rotating said rod causes said nuts to move along said rod in opposite directions, thereby changing the tensions of the springs affixed thereto.

References Cited by the Examiner

UNITED STATES PATENTS 2,850,240 9/1958 Dickinson _____ 340—198
2,879,501 3/1959 Baran _____ 340—198

NEIL C. READ, *Primary Examiner.*

THOMAS B. HABECKER, *Examiner.*